US010042835B2

(12) United States Patent
Fink et al.

(10) Patent No.: US 10,042,835 B2
(45) Date of Patent: *Aug. 7, 2018

(54) WEIGHTED ANNOTATION EVALUATION

(71) Applicant: INTERNATIONAL BUSINESS MACHINES CORPORATION, Armonk, NY (US)

(72) Inventors: Patrick W. Fink, Charlotte, NC (US); Kristin E. McNeil, Charlotte, NC (US); Philip E. Parker, York, SC (US); David B. Werts, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/655,930

(22) Filed: Jul. 21, 2017

(65) Prior Publication Data
US 2017/0315977 A1    Nov. 2, 2017

Related U.S. Application Data

(63) Continuation of application No. 15/085,106, filed on Mar. 30, 2016.

(51) Int. Cl.
*G06F 17/24* (2006.01)
*G06F 3/048* (2013.01)
(Continued)

(52) U.S. Cl.
CPC .......... *G06F 17/241* (2013.01); *G06F 3/0485* (2013.01); *G06F 3/04842* (2013.01)

(58) Field of Classification Search
CPC ... G06F 17/241; G06F 17/30289; G06F 19/28
See application file for complete search history.

(56) References Cited

U.S. PATENT DOCUMENTS 7,139,752 B2 *  11/2006  Broder .............. G06F 17/30616
7,225,397 B2    5/2007  Fukuda et al.
(Continued)

OTHER PUBLICATIONS

Anonymous, "Backlog Effort Estimation Using Text Analysis," an IP.com Prior Art Database Technical Disclosure, Oct. 21, 2013, p. 1-3, IP.com No. 000232151.
(Continued)

*Primary Examiner* — Scott Baderman
*Assistant Examiner* — Mario M Velez-Lopez
(74) *Attorney, Agent, or Firm* — Reza Sarbaksh

(57) ABSTRACT

A method for providing annotation summaries for annotations is provided. The method may include receiving annotations associated with analyzed unstructured data. The method may further include sorting the received annotations. Additionally, the method may include receiving focal points on the analyzed unstructured data. The method may also include extracting the sorted annotations associated with the focal points. The method may further include normalizing terms and phrases associated with the extracted annotations. The method may also include determining topics based on the normalized terms and phrases associated with the extracted annotations. The method may further include grouping the extracted annotations based on the determined topics. The method may also include summarizing the grouped annotations to generate a summarized annotation. The method may further include replacing the extracted annotations with the summarized annotation. The method may also include presenting the summarized annotation in place of the extracted annotations.

1 Claim, 5 Drawing Sheets

(51) Int. Cl.
*G06F 3/0484* (2013.01)
*G06F 3/0485* (2013.01)

(56) References Cited

U.S. PATENT DOCUMENTS

| | | | |
|---|---|---|---|
| 7,778,982 B2* | 8/2010 | Baker | G06F 17/2264 707/694 |
| 8,214,734 B2 | 7/2012 | Grabarnik et al. | |
| 8,627,203 B2* | 1/2014 | Chang | G06F 17/27 715/243 |
| 8,874,552 B2* | 10/2014 | Jehuda | G06F 17/30734 707/722 |
| 9,400,779 B2 | 7/2016 | Convertino et al. | |
| 9,495,349 B2* | 11/2016 | Angell | G06F 17/27 |
| 9,524,281 B2 | 12/2016 | Grabarnik et al. | |
| 9,684,683 B2* | 6/2017 | Dang | G06F 17/30321 |
| 9,767,165 B1* | 9/2017 | Tacchi | G06F 17/3053 |
| 2005/0197784 A1* | 9/2005 | Kincaid | G06F 17/30289 702/19 |
| 2008/0205694 A1* | 8/2008 | Sagoo | G06T 11/60 382/100 |
| 2009/0287642 A1* | 11/2009 | Poteet | G06Q 30/02 |
| 2012/0330946 A1* | 12/2012 | Arredondo | G06F 17/30528 707/728 |
| 2013/0054622 A1* | 2/2013 | Karmarkar | G06F 17/30032 707/749 |
| 2013/0191717 A1 | 7/2013 | Grabarnik et al. | |
| 2014/0040275 A1* | 2/2014 | Dang | G06F 17/2785 707/741 |
| 2014/0142922 A1 | 5/2014 | Liang et al. | |
| 2015/0106157 A1 | 4/2015 | Chang et al. | |
| 2015/0134634 A1 | 5/2015 | Gupta et al. | |
| 2015/0178262 A1 | 6/2015 | Bhatt et al. | |

OTHER PUBLICATIONS

Anonymous, "Using NLP, Content Analytics, and Predictive Analytics to Analyze and Group Similar Documents From a Larger Pool of Disorganized Documents" an IP.com Prior Art Database Technical Disclosure, Oct. 13, 2014, p. 1-2, IP.com No. 000239116.
Mell et al., "The NIST Definition of Cloud Computing," National Institute of Standards and Technology, Sep. 2011, p. 1-3, Special Publication 800-145.
Fink et al., Pending U.S. Appl. No. 15/085,106, filed Mar. 30, 2016, titled "Weighted Annotation Evaluation," pp. 1-36.
IBM: List of IBM Patents or Patent Applications Treated as Related (Appendix P), Jul. 21, 2017, pp. 1-2.

* cited by examiner

WEIGHTED ANNOTATION EVALUATION

BACKGROUND

The present invention relates generally to the field of computing, and more specifically, to data analysis.

Generally, text analytics/frameworks such as an unstructured information management architecture (UIMA) may be used as a framework for analyzing data. Specifically, the text analytics may use analysis engines and annotators to analyze unstructured data that may include documents, audio, video, and images. Furthermore, the text analytics/frameworks may present the analysis results on data structures, such as a common analysis structure (CAS), and may typically include associating annotations with the unstructured data, such as annotating the names of persons, organizations, locations, facilities, and products, which are not explicitly tagged or annotated in the unstructured data. For example, the text analytics/frameworks may use analysis engines and annotators to analyze the unstructured data associated with medical evaluation reports on patients in order to determine indicators of medical injury. Specifically, based on a patient medical report, the text analytics/frameworks may extract and annotate terms that are determined to be indicators of medical injury, such as the terms "fall," "pain," "other injuries," "other injuries to her left ankle," "swelling," "pain," "pain over the Achilles tendon," "pain," "ankle injury," "ankle sprain," "small fracture," "some pain," and "fracture."

SUMMARY

A method for providing at least one annotation summary for a plurality of annotations associated with at least one analyzed unstructured data is provided. The method may include receiving the plurality of annotations associated with the at least one analyzed unstructured data. The method may further include sorting the received plurality of annotations. Additionally, the method may include receiving at least one focal point on the at least one analyzed unstructured data. The method may also include extracting the sorted plurality of annotations associated with the received at least one focal point. The method may further include normalizing a plurality of terms and a plurality of phrases associated with the extracted plurality of annotations. The method may also include determining at least one topic based on the normalized plurality of terms and the normalized plurality of phrases associated with the extracted plurality of annotations. The method may further include grouping the extracted plurality of annotations based on the determined at least one topic. The method may also include summarizing the grouped plurality of annotations to generate at least one summarized annotation. The method may further include replacing the extracted plurality of annotations with the at least one summarized annotation. The method may also include presenting the at least one summarized annotation in place of the extracted plurality of annotations on the at least one analyzed unstructured data.

A computer system for providing at least one annotation summary for a plurality of annotations associated with at least one analyzed unstructured data is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving the plurality of annotations associated with the at least one analyzed unstructured data. The method may further include sorting the received plurality of annotations. Additionally, the method may include receiving at least one focal point on the at least one analyzed unstructured data. The method may also include extracting the sorted plurality of annotations associated with the received at least one focal point. The method may further include normalizing a plurality of terms and a plurality of phrases associated with the extracted plurality of annotations. The method may also include determining at least one topic based on the normalized plurality of terms and the normalized plurality of phrases associated with the extracted plurality of annotations. The method may further include grouping the extracted plurality of annotations based on the determined at least one topic. The method may also include summarizing the grouped plurality of annotations to generate at least one summarized annotation. The method may further include replacing the extracted plurality of annotations with the at least one summarized annotation. The method may also include presenting the at least one summarized annotation in place of the extracted plurality of annotations on the at least one analyzed unstructured data.

A computer program product for providing at least one annotation summary for a plurality of annotations associated with at least one analyzed unstructured data is provided. The computer program product may include one or more computer-readable storage devices and program instructions stored on at least one of the one or more tangible storage devices, the program instructions executable by a processor. The computer program product may include program instructions to receive the plurality of annotations associated with the at least one analyzed unstructured data. The computer program product may further include program instructions to sort the received plurality of annotations. Additionally, the computer program product may also include program instructions to receive at least one focal point on the at least one analyzed unstructured data. The computer program product may further include program instructions to extract the sorted plurality of annotations associated with the received at least one focal point. The computer program product may also include program instructions to normalize a plurality of terms and a plurality of phrases associated with the extracted plurality of annotations. The computer program product may further include program instructions to determine at least one topic based on the normalized plurality of terms and the normalized plurality of phrases associated with the extracted plurality of annotations. The computer program product may also include program instructions to group the extracted plurality of annotations based on the determined at least one topic. The computer program product may further include program instructions to summarize the grouped plurality of annotations to generate at least one summarized annotation. The computer program product may also include program instructions to replace the extracted plurality of annotations with the at least one summarized annotation. The computer program product may further include program instructions to present the at least one summarized annotation in place of the extracted plurality of annotations on the at least one analyzed unstructured data.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
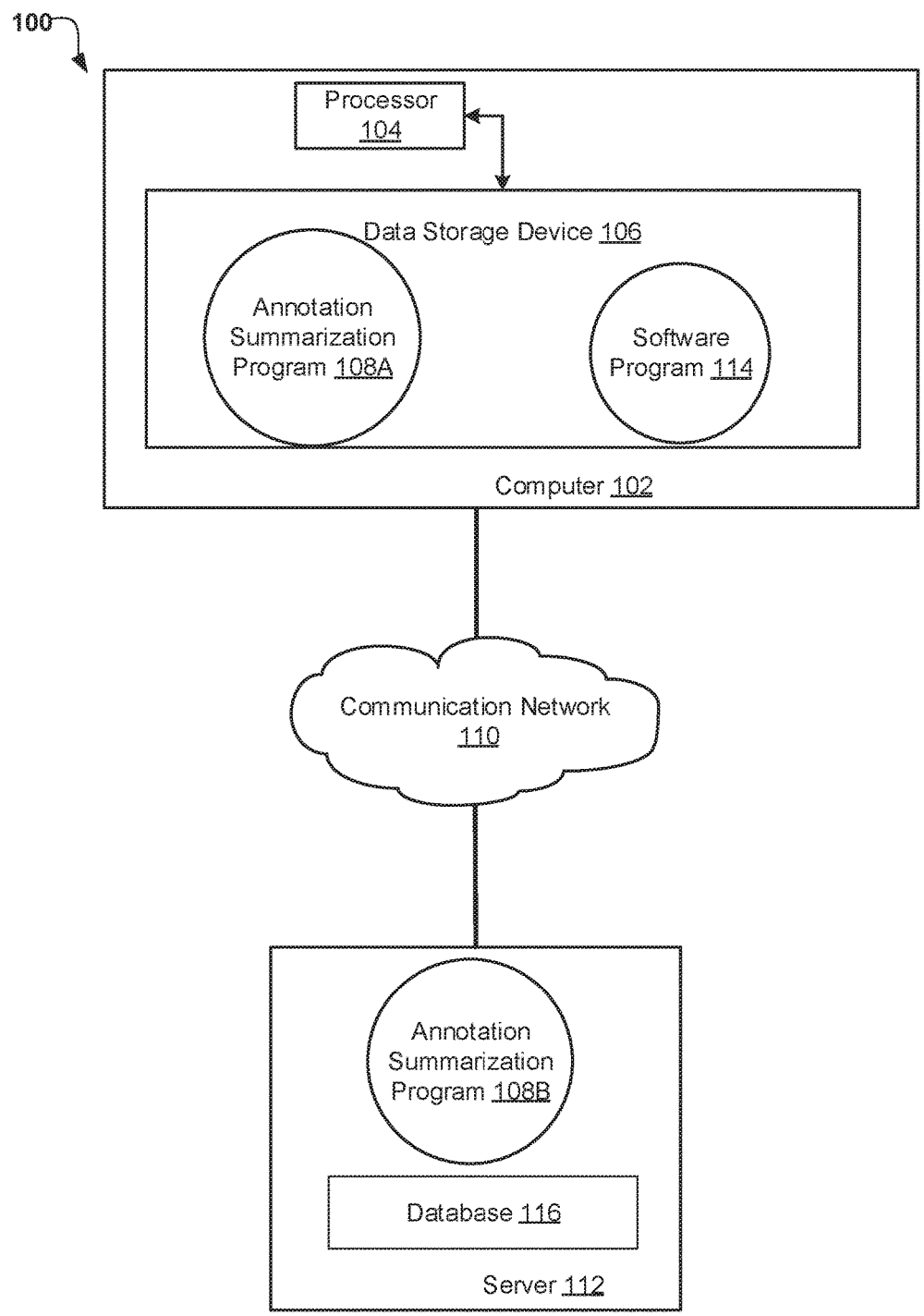
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate generally to the field of computing, and more particularly, to data analysis. The following described exemplary embodiments provide a system, method and program product for providing annotation summaries to annotations based on analysis results associated with unstructured data. Therefore, the present embodiment has the capacity to improve the technical field associated with data analysis by filtering out redundant and related annotations based on the analysis results associated with the unstructured data. Specifically, the present embodiment may receive annotations associated with analyzed unstructured data, determine topics associated with the annotations, and summarize the annotations based on the determined topics.

As previously described with respect to data analysis, text analytics/frameworks such as UIMA may use analysis engines and annotators to analyze unstructured data that may include documents, audio, video, and images. For example, and as previously described, the text analytics/frameworks may analyze the unstructured data associated with medical evaluation reports by extracting and annotating medical injury indicators. However, because the analysis engines and annotators may broadly analyze the unstructured data, the text analytics/frameworks may extract and annotate redundant terms and related terms resulting in excessive analysis results. Specifically, and as previously described, the text analytics/frameworks may use analysis engines to annotate medical injury indicators such as "fall," "pain," "other injuries," "other injuries to her left ankle," "swelling," "pain," "pain over the Achilles tendon," "pain," "ankle injury," "ankle sprain," "small fracture," "some pain," and "fracture." Therefore, the text analytics/frameworks may extract and annotate redundant terms such as "pain" and "pain," and related terms such as "other injuries," "other injuries to her left ankle," "swelling," "pain," "pain over the Achilles tendon," and "ankle injury," as well as "fracture" and "small fracture," thereby resulting in excessive extractions and annotations. As such, it may be advantageous, among other things, to provide a system, method and program product for providing annotation summaries to annotations based on analysis results associated with unstructured data. Specifically, the system, method, and program product may receive annotations associated with analyzed unstructured data, determine topics associated with the annotations, and summarize the annotations based on the determined topics.

According to at least one implementation of the present embodiment, annotations associated with analyzed unstructured data may be received. Next, the received annotations may be sorted. Then, focal points associated with the analyzed unstructured data may be received. Next, the sorted annotations associated with the received focal points may be extracted. Then, terms and phrases associated with the extracted annotations may be normalized. Next, topics associated with the extracted annotations may be determined based on the normalized terms and phrases. Then, based on the determined topics, the extracted annotations may be grouped. Next, the grouped annotations may be summarized. Then, the extracted annotations associated with the received focal points may be replaced with the summarized annotations. Next, the summarized annotations may be presented on the analyzed unstructured data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for providing annotation summaries to annotations associated with analyzed unstructured data.

According to at least one implementation, annotations associated with analyzed unstructured data may be received. Next, the received annotations may be sorted. Then, focal points associated with the analyzed unstructured data may be received. Next, the sorted annotations associated with the received focal points may be extracted. Then, terms and phrases associated with the extracted annotations may be normalized. Next, topics associated with the extracted annotations may be determined based on the normalized terms and phrases. Then, based on the determined topics, the extracted annotations may be grouped. Next, the grouped annotations may be summarized. Then, the extracted annotations associated with the received focal points may be replaced with the summarized annotations. Next, the summarized annotations may be presented on the analyzed unstructured data.

Referring now to FIG. 1, an exemplary networked computer environment 100 in accordance with one embodiment is depicted. The networked computer environment 100 may include a computer 102 with a processor 104 and a data storage device 106 that is enabled to run an annotation summarization program 108A and a software program 114. The software program 114 may be an application program such as IBM® Advanced Care Insights (IBM and all IBM—based trademarks and logos are trademarks or registered trademarks of International Business Machines and/or its affiliates). The annotation summarization program 108A may communicate with the software program 114. The networked computer environment 100 may also include a server 112 that is enabled to run an annotation summarization program 108B and a communication network 110. The networked computer environment 100 may include a plurality of computers 102 and servers 112, only one of which is shown for illustrative brevity.

According to at least one implementation, the present embodiment may also include a database 116, which may be running on server 112. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 3, server computer 112 may include internal components 800a and external components 900a, respectively, and client computer 102 may include internal components 800b and external components 900b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing device capable of running a program and accessing a network. According to various implementations of the present embodiment, the annotation summarization program 108A, 108B may interact with a database 116 that may be embedded in various storage devices, such as, but not limited to a mobile device 102, a networked server 112, or a cloud storage service.

According to the present embodiment, a program, such as an annotation summarization program 108A and 108B may run on the client computer 102 or on the server computer 112 via a communications network 110. The annotation summarization program 108A, 108B may provide annotation summaries to annotations based on analysis results associated with unstructured data. Specifically, a user using a computer, such as computer 102, may run an annotation summarization program 108A, 108B, that interacts with a software program 114, to receive annotations associated with analyzed unstructured data, determine the topics associated with the received annotations, and summarize the received annotations based on the determined topics.

Figure 2:
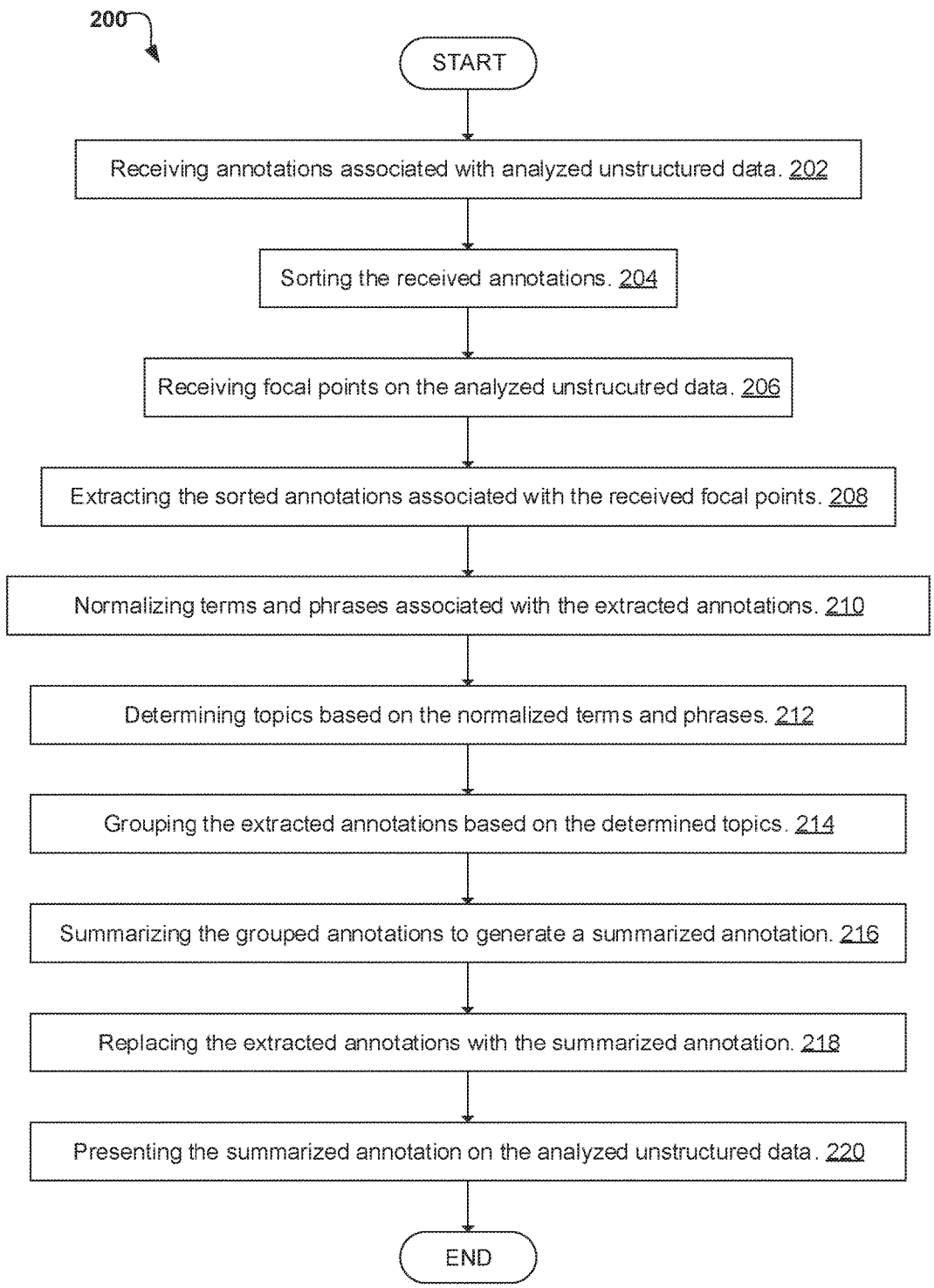
FIG. 2 is an operational flowchart illustrating the steps carried out by a program for providing annotation summaries to annotations associated with analyzed unstructured data according to one embodiment.

Referring now to FIG. 2, an operational flowchart 200 illustrating the steps carried out by a program for providing annotation summaries to annotations associated with analyzed unstructured data is depicted. At 202, the annotation summarization program 108A, 108B (FIG. 1) may receive annotations associated with the analyzed unstructured data. For example, and as previously described, a software program 114 (FIG. 1), such as IBM® Advanced Care Insights, may analyze unstructured data that may include a document such as a medical evaluation report. Furthermore, based on the analysis, annotations may be generated on the unstructured data, and the annotations and the analyzed unstructured data may be stored on a data structure such as a common analysis structure (CAS). For example, IBM® Advanced Care Insights may analyze the medical evaluation report by providing annotations on the medical evaluation report of the terms and phrases that are determined to be medical injury indicators, such as the terms and phrases "dry cracked nail," "chest pain," "shortness of breath," "smelling of toe," and "swelling of toe." Specifically, the annotation may include a statement such as, "smelling of toe is a medical injury indicator." As such, the annotation summarization program 108A, 108B (FIG. 1) may interact with the software program 114 (FIG. 1) and the CAS to receive the annotations associated with the analyzed unstructured data.

Next, at 204, the annotation summarization program 108A, 108B (FIG. 1) may sort the received annotations. Specifically, the annotation summarization program 108A, 108B (FIG. 1) may sort the received annotations based on annotation type. For example, the annotation summarization program 108A, 108B (FIG. 1) may receive annotations based on a medical evaluation report that may include annotated terms and phrases associated with annotation types such as medical injury indicators, medical procedures, and medicines. Specifically, the annotation summarization program 108A, 108B (FIG. 1) may receive annotations based on an annotation type, such as medical injury, and may include the annotated terms and phrases such as "dry cracked nail," "chest pain," "shortness of breath," "smelling of toe," and "swelling of toe." Furthermore, the annotation summarization program 108A, 108B (FIG. 1) may receive annotations based on an annotation type, such as medicines, and may include the annotated terms and phrases such as "antifungal pills," "topical cream," "anticoagulants," "beta blockers," and "diuretics." As such, the annotation summarization program 108A, 108B (FIG. 1) may sort the annotations by grouping the annotated terms and phrases associated with medical injuries, and grouping the annotated terms and phrases associated with medicines.

Then, at 206, the annotation summarization program 108A, 108B (FIG. 1) may receive focal points based on the analyzed unstructured data. As previously described at step 202, the annotation summarization program 108A, 108B (FIG. 1) may receive annotations associated with analyzed unstructured data that may include a document such as a medical evaluation report. Furthermore, based on user input, the annotation summarization program 108A, 108B (FIG. 1) may focus on different parts of the analyzed unstructured data, thereby enabling users to choose the annotations to summarize, by receiving focal points on the analyzed unstructured data. Specifically, based on user input, the annotation summarization program 108A, 108B (FIG. 1) may receive focal points such as term focal points, phrase focal points, sentence focal points, paragraph focal points, section focal points, and document focal points. For example, based on user input, the annotation summarization program 108A, 108B (FIG. 1) may receive a paragraph focal point. Therefore, the annotation summarization program 108A, 108B (FIG. 1) may focus on the paragraph that is associated with the received paragraph focal point.

Next, at 208, the annotation summarization program 108A, 108B (FIG. 1) may extract the sorted annotations associated with the received focal points. As previously described at step 206, based on received focal points, the annotation summarization program 108A, 108B (FIG. 1) may focus on parts of the analyzed unstructured data. Thereafter, the annotation summarization program 108A, 108B (FIG. 1) may extract the sorted annotations associated with the received focal points. For example, the analyzed unstructured data may include a document such as a medical evaluation report. Furthermore, based on user input, the annotation summarization program 108A, 108B (FIG. 1) may receive a paragraph focal point to focus on a paragraph associated with the medical evaluation report, whereby the paragraph may include sorted annotations based on the annotation type "medical injury" that are associated with the terms "dry cracked nail," "chest pain," "shortness of breath," "smelling of toe," and "swelling of toe." Therefore, the annotation summarization program 108A, 108B (FIG. 1)

may extract the sorted annotations associated with the terms "dry cracked nail," "chest pain," "shortness of breath," "smelling of toe," and "swelling of toe."

Next, at 210, the annotation summarization program 108A, 108B (FIG. 1) may normalize the terms and phrases associated with the extracted annotations. Specifically, the annotation summarization program 108A, 108B (FIG. 1) may normalize the terms and phrases associated with the extracted annotations based on a unified modeling language structure. For example, and as previously described at step 208, the annotation summarization program 108A, 108B (FIG. 1) may extract sorted annotations associated with terms and phrases such as "dry cracked nail," "chest pain," "shortness of breath," "smelling of toe," and "swelling of toe." Furthermore, the annotation summarization program 108A, 108B (FIG. 1) may determine that a unified modeling language structure based on medical terms and phrases may associate the phrase "smelling of toe" with the phrase "toe odor." Therefore, based on the unified modeling language structure, the annotation summarization program 108A, 108B (FIG. 1) may normalize the term "smelling of toe" to "toe odor."

Then, at 212, the annotation summarization program 108A, 108B (FIG. 1) may determine topics associated with the extracted annotations based on the normalized terms and phrases. Specifically, the annotation summarization program 108A, 108B (FIG. 1) may determine topics associated with the extracted annotations by comparing the normalized terms and phrases to ontologies, and scoring the normalized terms and phrases based on the comparison. More specifically, and as previously described at steps 208 and 210, the annotation summarization program 108A, 108B (FIG. 1) may extract sorted annotations associated with a medical evaluation report, and normalize the terms and phrases associated with the extracted annotations. Thereafter, the annotation summarization program 108A, 108B (FIG. 1) may determine topics associated with the extracted annotations by comparing the normalized terms and phrases to diseases, ailments, and symptoms based on medical ontologies. Then, based on a relation threshold value, the annotation summarization program 108A, 108B (FIG. 1) may score the normalized terms based on the comparison. Specifically, the annotation summarization program 108A, 108B (FIG. 1) may use the relation threshold value to determine the normalized terms and phrases degree of relation to the diseases, ailments, and symptoms associated with the medical ontologies.

For example, the annotation summarization program 108A, 108B (FIG. 1) may compare the normalized terms and phrases such as "dry cracked nail," "toe odor," and "toe swelling" to diseases, ailments, and symptoms associated with the medical ontologies. Furthermore, the annotation summarization program 108A, 108B (FIG. 1) may set a relation threshold value of 50%, whereby normalized terms that are related to a disease, ailment, and/or symptom greater than (>) 50% are associated with that disease, ailment, and/or symptom. Next, based on the comparison, the annotation summarization program 108A, 108B (FIG. 1) may determine that the normalized term "dry cracked nail" is 95% related to the topic "toe fungus," the normalized term "toe odor" is 70% related to the topic "toe fungus," and the normalized term "toe swelling" is 90% related to the topic "toe fungus." Also, for example, the annotation summarization program 108A, 108B (FIG. 1) may compare the normalized terms and phrases such as "chest pain" and "shortness of breath" to diseases, ailments, and symptoms associated with the medical ontologies. Then, based on the comparison, the annotation summarization program 108A, 108B (FIG. 1) may determine that the normalized term "chest pain" is 100% related to the topic "heart attack," and that the normalized term "shortness of breath" is 95% related to the topic "heart attack." Therefore, the annotation summarization program 108A, 108B (FIG. 1) may determine that the topic "toe fungus" may be associated with the extracted annotations that include the normalized terms "dry cracked nail," "toe odor," and "toe swelling," and determine that the topic "heart attack" may be associated with the extracted annotations that include the normalized terms "chest pain" and "shortness of breath."

Next, at 214, the annotation summarization program 108A, 108B (FIG. 1) may group the extracted annotations based on the determined topics. As previously described at step 212, the annotation summarization program 108A, 108B (FIG. 1) may determine topics associated with the extracted annotations based on the normalized terms and phrases. For example, the annotation summarization program 108A, 108B (FIG. 1) may determine that the topic "toe fungus" may be associated with the extracted annotations that include the normalized terms "dry cracked nail," "toe odor," and "toe swelling," and determine that the topic "heart attack" may be associated with the extracted annotations that include the normalized terms "chest pain" and "shortness of breath." Therefore, the annotation summarization program 108A, 108B (FIG. 1) may group the extracted annotation that includes the normalized phrase "dry cracked nail" with the extracted annotation that includes the normalized phrase "toe odor" as well as with the extracted annotation that includes the normalized phrase "toe swelling." Additionally, the annotation summarization program 108A, 108B (FIG. 1) may group the extracted annotation that includes the normalized phrase "chest pain" with the extracted annotation that includes the normalized phrase "shortness of breath."

Then, at 216, the annotation summarization program 108A, 108B (FIG. 1) may summarize the grouped annotations based on the determined topics to generate a summarized annotation. As previously described at steps 212 and 214, the annotation summarization program 108A, 108B (FIG. 1) may determine topics to associate with the extracted annotations, and then group the extracted annotations based on the determined topics. As such, the annotation summarization program 108A, 108B (FIG. 1) may summarize the grouped annotations into at least one phrase and/or topic based on the determined topic. For example, based on the determined topic "toe fungus," the annotation summarization program 108A, 108B (FIG. 1) may group the extracted annotation that includes the normalized phrase "dry cracked nail" with the extracted annotation that includes the normalized phrase "toe odor" as well as with the extracted annotation that includes the normalized phrase "toe swelling" that are based on the annotation type "medical injury." Thereafter, the annotation summarization program 108A, 108B (FIG. 1) may summarize the grouped annotations into at least one phrase/topic such as "medical injury—toe fungus," and generate a summarized annotation that includes "medical injury—toe fungus."

Next, at 218, the annotation summarization program 108A, 108B (FIG. 1) may replace the extracted annotations with the summarized annotation. As previously described at steps 206 and 208, based on user input, the annotation summarization program 108A, 108B (FIG. 1) may receive a paragraph focal point associated with the analyzed unstructured data and extract the sorted annotations associated with the received paragraph focal point. Furthermore, and as previously described at steps 214 and 216, the annotation summarization program 108A, 108B (FIG. 1) may group the extracted annotations, and summarize the grouped annotations to generate a summarized annotation. Therefore, the annotation summarization program 108A, 108B (FIG. 1) may replace the extracted annotations associated with the received paragraph focal point with the summarized annotation. For example, the annotation summarization program 108A, 108B (FIG. 1) may extract sorted annotations associated with the phrases "dry cracked nail," "chest pain," "shortness of breath," "smelling of toe," and "swelling of toe" based on a received paragraph focal point. Thereafter, the annotation summarization program 108A, 108B (FIG. 1) may group the extracted annotations associated with the phrases "dry cracked nail," "smelling of toe," and "swelling of toe" based on a determined topic, such as "toe fungus," that is associated with the normalized version of the terms and phrases included in the extracted annotations. Then, the annotation summarization program 108A, 108B (FIG. 1) may summarize the grouped annotations to generate a summarized annotation, such as "medical injury—toe fungus." As such, the annotation summarization program 108A, 108B (FIG. 1) may replace the extracted annotations associated with the phrases "dry cracked nail," "smelling of toe," and "swelling of toe" with the at least one summarized phrase "medical injury—toe fungus."

Then, at 220, the annotation summarization program 108A, 108B (FIG. 1) may present the summarized annotation on the analyzed unstructured data. As previously described at step 218, the annotation summarization program 108A, 108B (FIG. 1) may replace the extracted annotations with the summarized annotation. Therefore, in place of the extracted annotations, the summarized annotation may be presented on the analyzed unstructured data. For example, the annotation summarization program 108A, 108B (FIG. 1) may replace the extracted annotations associated with the phrases "dry cracked nail," "smelling of toe," and "swelling of toe" with the at least one summarized phrase "medical injury—toe fungus." Therefore, on the paragraph associated with the received paragraph focal point, the annotation summarization program 108A, 108B (FIG. 1) may present the summarized annotation "medical injury—toe fungus" on the analyzed unstructured data in place of the extracted annotations associated with the phrases "dry cracked nail," "smelling of toe," and "swelling of toe."

It may be appreciated that FIG. 2 provides only illustrations of one implementation and does not imply any limitations with regard to how different embodiments may be implemented. Many modifications to the depicted environments may be made based on design and implementation requirements. For example, in response to a user action such as a user scrolling over or clicking on the presented summarized annotation, the annotation summarization program 108A, 108B (FIG. 1) may display the extracted annotations that are associated with the summarized annotation. For example, in response to a user scrolling over or clicking on the summarized annotation "medical injury—toe fungus" on the analyzed unstructured data, the annotation summarization program 108A, 108B (FIG. 1) may display the extracted annotations associated with the phrases "dry cracked nail," "smelling of toe," and "swelling of toe."

Figure 3:
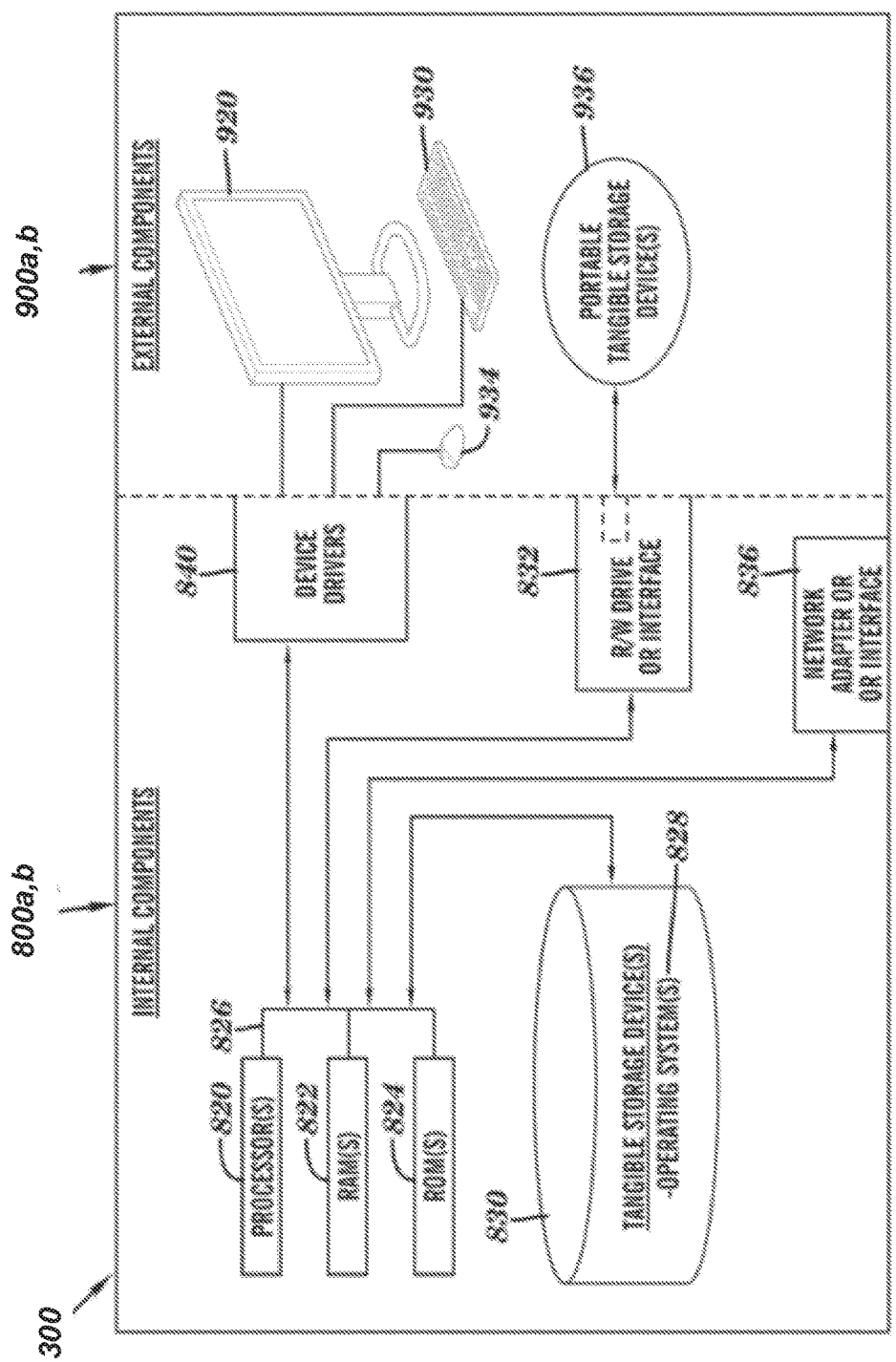
FIG. 3 is a block diagram of the system architecture of a program for providing annotation summaries to annotations associated with analyzed unstructured data according to one embodiment.

FIG. 3 is a block diagram 300 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 800 *a, b* and external components 900 *a, b* illustrated in FIG. 3. Each of the sets of internal components 800 *a, b* includes one or more processors 820, one or more computer-readable RAMs 822, and one or more computer-readable ROMs 824 on one or more buses 826, and one or more operating systems 828 and one or more computer-readable tangible storage devices 830. The one or more operating systems 828, the software program 114 (FIG. 1) and the annotation summarization program 108A (FIG. 1) in client computer 102 (FIG. 1), and the annotation summarization program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 *a, b*, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as an annotation summarization program 108A and 108B (FIG. 1), can be stored on one or more of the respective portable computer-readable tangible storage devices 936, read via the respective R/W drive or interface 832 and loaded into the respective hard drive 830.

Each set of internal components 800 *a, b* also includes network adapters or interfaces 836 such as a TCP/IP adapter cards, wireless Wi-Fi interface cards, or 3G or 4G wireless interface cards or other wired or wireless communication links. The annotation summarization program 108A (FIG. 1) and software program 114 (FIG. 1) in client computer 102 (FIG. 1), and the annotation summarization program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the annotation summarization program 108A (FIG. 1) and software program 114 (FIG. 1) in client computer 102 (FIG. 1) and the annotation summarization program 108B (FIG. 1) in network server computer 112 (FIG. 1) are loaded into the respective hard drive 830. The network may comprise copper wires, optical fibers, wireless transmission, routers, firewalls, switches, gateway computers, and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 a, b also includes device drivers 840 to interface to computer display monitor 920, keyboard 930, and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
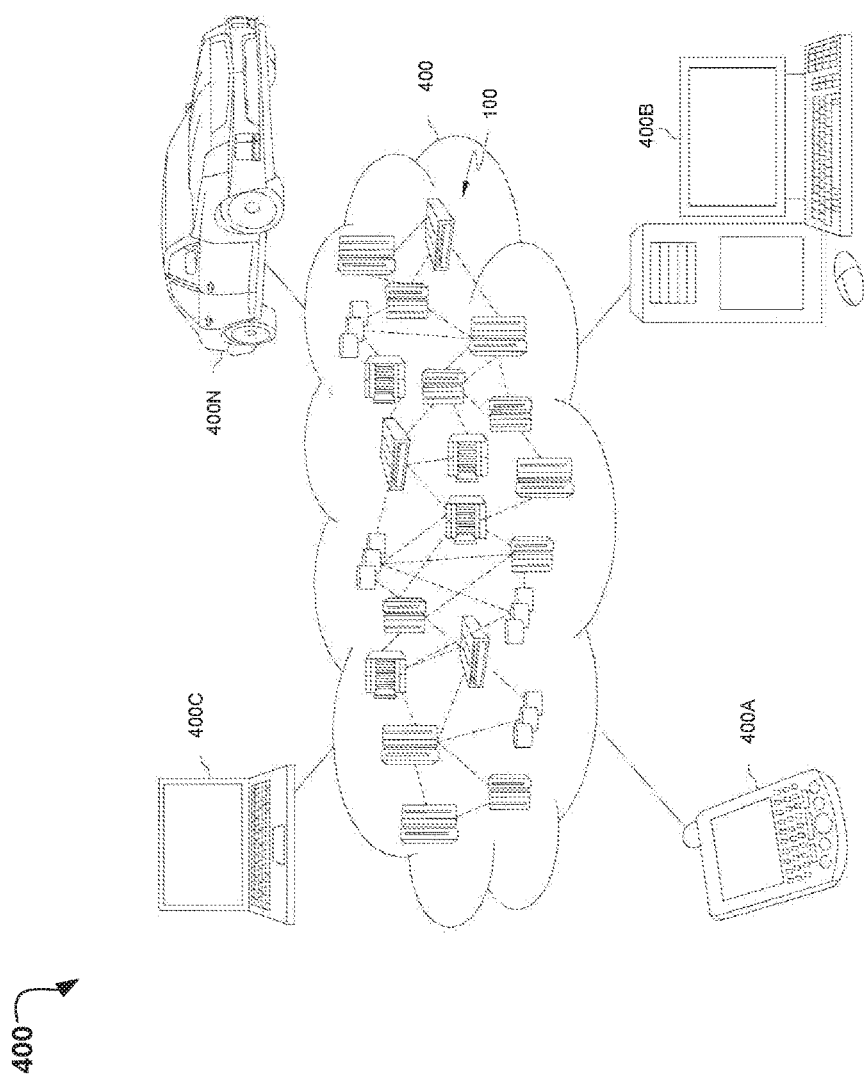
FIG. 4 is a block diagram of an illustrative cloud computing environment including the computer system depicted in FIG. 1, in accordance with an embodiment of the present disclosure.

Referring now to FIG. 4, illustrative cloud computing environment 400 is depicted. As shown, cloud computing environment 400 comprises one or more cloud computing nodes 100 with which local computing devices used by cloud consumers, such as, for example, personal digital assistant (PDA) or cellular telephone 400A, desktop computer 400B, laptop computer 400C, and/or automobile computer system 400N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 400A-N shown in FIG. 4 are intended to be illustrative only and that computing nodes 100 and cloud computing environment 400 can communicate with any type of computerized device over any type of network and/or network addressable connection (e.g., using a web browser).

Figure 5:
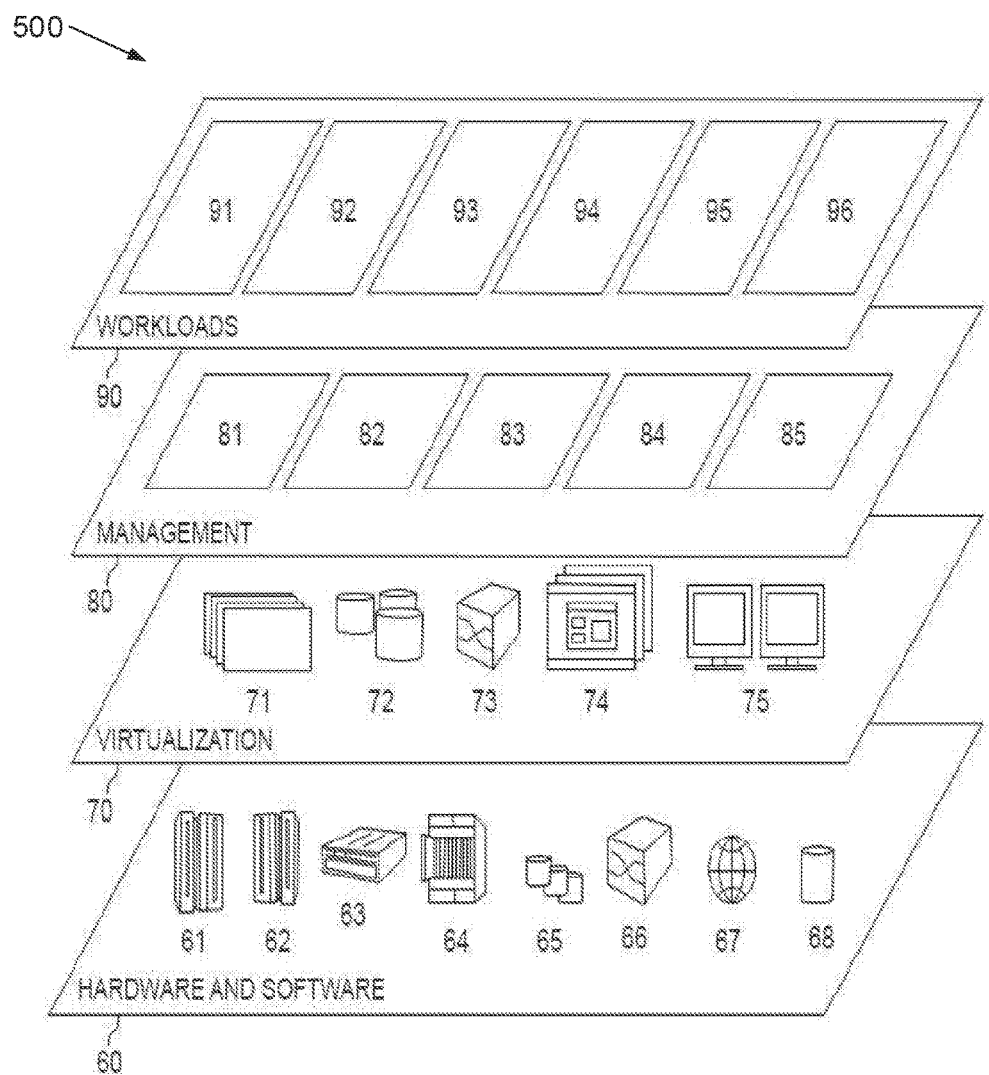
FIG. 5 is a block diagram of functional layers of the illustrative cloud computing environment of FIG. 4, in accordance with an embodiment of the present disclosure.

Referring now to FIG. 5, a set of functional abstraction layers 500 provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and annotation summarization 96. An annotation summarization program 108A, 108B (FIG. 1) may be offered "as a service in the cloud" (i.e., Software as a Service (SaaS)) for applications running on mobile devices 102 (FIG. 1) and may provide annotation summaries to annotations associated with analyzed unstructured data.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for providing at least one annotation summary for a plurality of annotations associated with at least one analyzed unstructured data, comprising:
   one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
   extracting and receiving the at least one analyzed unstructured data, wherein the at least one analyzed unstructured data is associated with a document based on an audio, video, or image file;
   receiving the plurality of annotations associated with the at least one analyzed unstructured data from at least one common analysis structure (CAS);
   sorting the received plurality of annotations by sorting the received plurality of annotations based on at least one annotation type;
   receiving at least one focal point on the at least one analyzed unstructured data, wherein the at least one focal point is based on text;
   extracting the sorted plurality of annotations associated with the received at least one focal point;
   normalizing a plurality of terms and a plurality of phrases associated with the extracted plurality of annotations based on at least one unified modeling language structure;
   determining at least one topic based on the normalized plurality of terms and the normalized plurality of phrases associated with the extracted plurality of annotations by comparing the normalized terms and the normalized phrases associated with the extracted annotations to at least one ontology associated with the analyzed unstructured data, and scoring the normalized terms and the normalized phrases associated with the extracted annotations based on the comparison and at least one relation threshold value;
   grouping the extracted plurality of annotations based on the determined at least one topic;
   summarizing the grouped plurality of annotations to generate at least one summarized annotation;
   replacing the extracted plurality of annotations with the at least one summarized annotation;
   presenting the at least one summarized annotation in place of the extracted plurality of annotations on the at least one analyzed unstructured data; and
   in response to receiving at least one user action, displaying the extracted plurality of annotations associated with the at least one summarized annotation.

* * * * *